Oct. 27, 1964    J. E. McCAFFERTY    3,154,355
EQUALIZING THRUST LOAD BETWEEN THRUST BEARINGS
Filed May 15, 1963    2 Sheets-Sheet 1
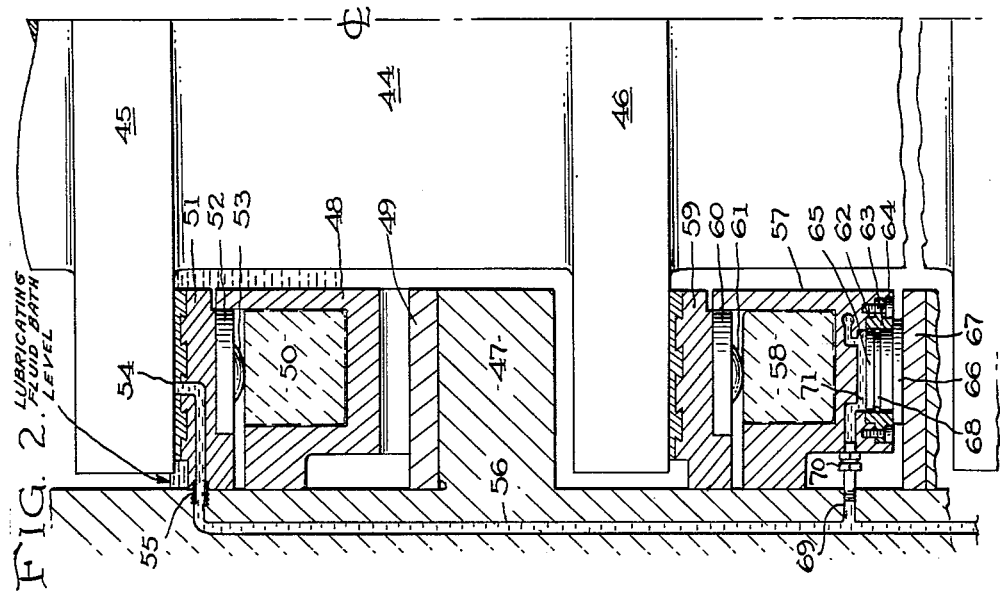
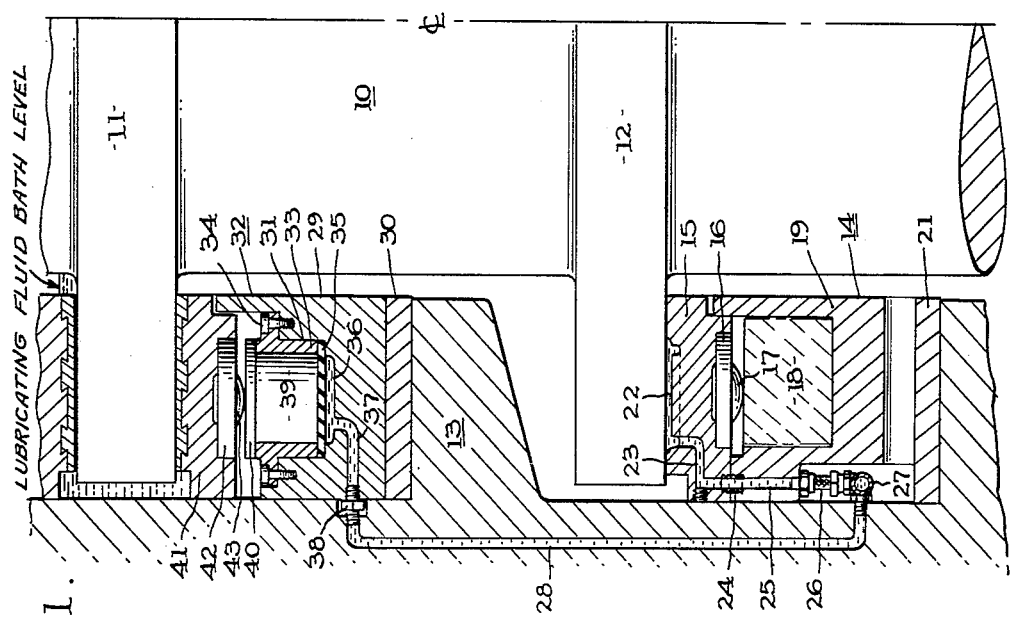
INVENTOR
JAMES E. McCAFFERTY
BY
Cameron, Kerkam + Sutton
ATTORNEYS

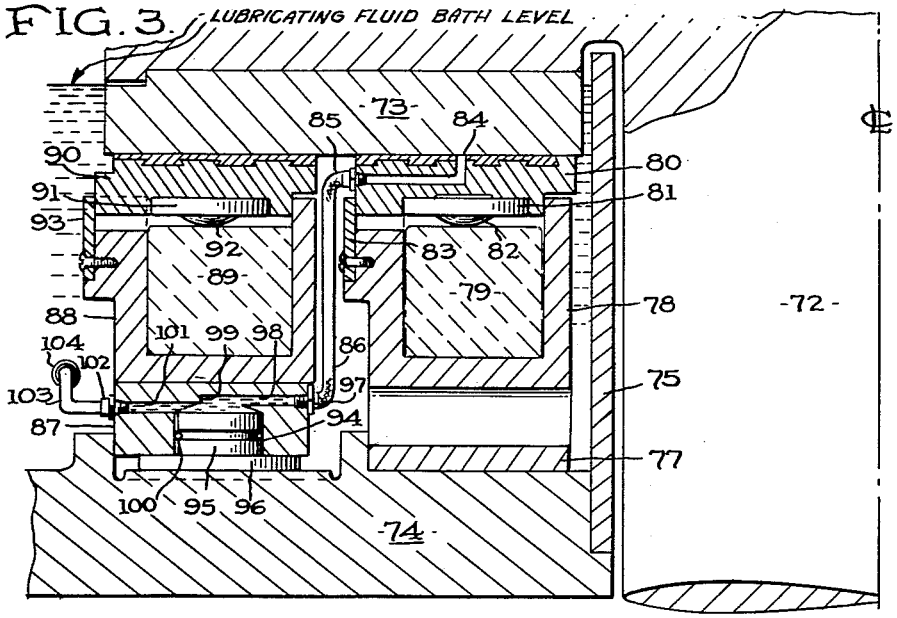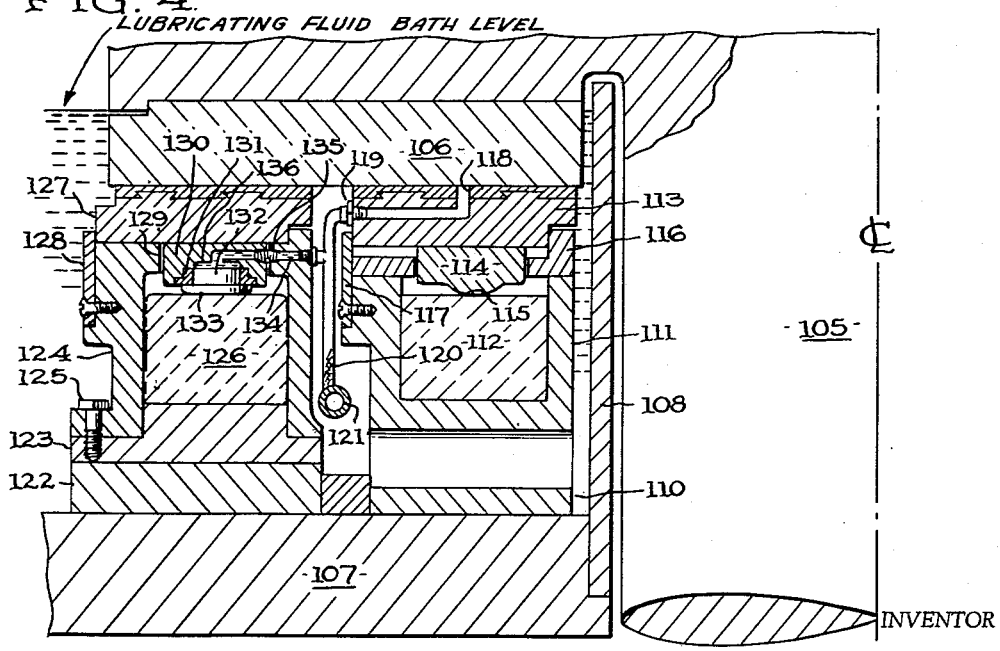

United States Patent Office 3,154,355
Patented Oct. 27, 1964

3,154,355
EQUALIZING THRUST LOAD BETWEEN THRUST BEARINGS
James E. McCafferty, Springfield, Pa., assignor to Kingsbury Machine Works, Inc., Philadelphia, Pa., a corporation of Delaware
Filed May 15, 1963, Ser. No. 280,618
15 Claims. (Cl. 308—160)

This invention relates to equalizing thrust load between thrust bearings of the Kingsbury type and more particularly to equalizing thrust load between bearings of the Kingsbury type in which one such thrust bearing receives the load when thrust is first applied to the bearing and thereafter other thrust bearings of the Kingsbury type are automatically actuated to receive and share the entire thrust load.

Heretofore, in various of the Kingsbury patents, pressure has been equalized between the several shoes of a typical Kingsbury type thrust bearing by raising or lowering the shoes by hydraulic pressure in a closed circuit serving all of the shoes. In United States Patent No. 1,169,206 to S. K. Sydney thrust bearings in tandem on a single shaft are shown and the pressure is equalized on all of the shoes of each of the bearings by providing each of the shoes with hydraulic pressure from a common source to apply equal pressure to each of the shoes. In the Sydney patent the hydraulic pressure is supplied from an exterior source and is applied equally at all times to each and all of the shoes. The pressure supplied in the Sydney patent is not correlated with the thrust bearing pressure received from the shaft and in Sydney all of the shoes engage their respective thrust collars with equal force at all times.

It has now been found that improved operation of bearings of this type is obtained if one of the bearings, which receives the thrust load when the bearing is first put in operation, transmits fluid under pressure to the shoes of the other bearing or bearings to raise these bearing shoes in proportion to the thrust load exerted on the first bearing to bring these other shoes into bearing engagement with their respective thrust collars to take their share of the thrust load. Preferably, lubricating oil from the bearing surface or surfaces of the bearing shoe or shoes of the first bearing placed under pressure by the thrust load is conducted to the bearing shoes of the other thrust bearing or other thrust bearings to lift these shoes into engagement with their respective thrust collars to distribute the total thrust load over the several thrust bearings.

The bearings of the present concept have marked advantages over those heretofore proposed in that an entirely self contained system can be used not dependent upon fluid under pressure from an outside source thus reducing the complexity of structure and the cost thereof. When single thrust bearings are arranged in tandem on a single shaft, about 25 to 30% in the diameter of the bearing housing is saved as compared to that of an equivalent single bearing. Reduction in friction is also obtained.

When two or more single thrust bearings of the Kingsbury type receive the thrust from a single thrust collar and are arranged concentrically about the shaft, one of the single bearings is utilized to supply oil under pressure to the other thrust bearing concentric therewith to raise the shoes of the other bearing as the thrust load increases to take their proportionate share of the thrust load. Here again, lubricating oil under pressure from the bearing surface of the bearing shoe or shoes of the first thrust bearing is transmitted, as the hydraulic fluid under pressure, to raise the shoes of the other thrust bearing concentric therewith. It is of course possible to have more than two concentric thrust bearings for the same thrust collar within the present concept.

A typical single Kingsbury thrust bearing will have six thrust shoes of known type mounted for levelling movement in their support structure. One or more of the shoes of a single thrust bearing are arranged to act as the "sender" and have openings through their bearing surfaces to take lubricating oil under pressure therefrom. If more than one such shoe is utilized for obtaining oil under pressure, the several openings in the shoes are connected to a header and this header in turn is connected to chambers beneath the bearing shoes of the other thrust bearing or bearings on the common shaft. A piston in each of these chambers actuates the bearing shoes of the "receiver" thrust bearing or bearings. Each piston, actuated by the lubricating oil under pressure supplied thereto, lifts its bearing shoe into engagement with the adjacent thrust collar to take the proportionate share of the thrust load.

It is therefore the object of the present invention to provide equalizing of thrust load between Kingsbury type thrust bearings in which one thrust bearing is employed as a "sender" to provide fluid under pressure, which may be lubricating oil, to the other thrust bearing or bearings where it is utilized to raise the bearing shoes of the other thrust bearing or bearings into contact with their thrust collar or collars to distribute the entire thrust load between the several thrust bearings.

The present invention is capable of various mechanical embodiments, certain of which are shown in the accompanying drawings and are described hereinafter for purposes of illustrating the present inventive concept. These embodiments should not be construed as defining or limiting the present invention.

In the accompanying drawings, in which like reference characters indicate like parts, FIG. 1 is a view partly in section of Kingsbury type thrust bearings arranged in tandem about a shaft with the lower thrust bearing acting as the "sender" providing lubricating oil under pressure to the upper thrust bearings in accordance with the present concept;

FIG. 2 is another embodiment of the present concept in which Kingsbury type thrust bearings are mounted in tandem about a shaft, the upper thrust bearing being the "sender" providing lubricating oil under pressure to the lower thrust bearing;

FIG. 3 is a view partly in section of Kingsbury type thrust bearings arranged concentrically about a shaft and receiving the thrust load from a single thrust collar with the inner thrust bearing being the "sender" of lubricating oil under pressure to the outer thrust bearing; and FIG. 4 is a view partly in section of another embodiment of the present invention somewhat similar to that of FIG. 3 employing a header for the lubricating oil under pressure mounted between the concentric thrust bearings.

Referring now more particularly to FIG. 1, a shaft 10 is provided with suitably spaced thrust collars 11 and 12, shaft 10 and collars 11 and 12 being surrounded by a suitable bearing housing 13. A Kingsbury type thrust bearing of conventional construction conventionally submerged in lubricating oil as in U.S. Patent No. 2,621,090 modified to become the "sender" bearing is mounted in housing 13 around shaft 10 for receiving thrust from collar 12 and is shown generally at 14. This thrust bearing can have any desired number of bearing shoes, usually six in number, one of which is shown at 15. Shoe 15 is provided with an insert 16 having a lower rounded surface 17 so that shoe 15 can tilt as may be required. Shoe 15 is supported by load equalizing plates of known construction generally indicated at 18 with all of the shoes and equalizing plates being supported in an annular base ring 19 mounted on filler plate 21, as may be required.

Shoe 15 is provided with a groove 22 in its bearing surface to collect lubricating oil under pressure when shaft 10 is rotating. This oil under pressure is taken through duct 23 in shoe 15 and through flexible coupling 24 to duct 25 in base ring 19. Duct 25 connects through flexible coupling 26 to header 27 which extends around the outside of base ring 19 to receive lubricating oil under pressure from other of the shoes 15 which are modified to collect the lubricating oil under pressure. Header 27 is connected by duct 28 in bearing housing 13 to the upper thrust bearing assembly or "receiver" bearing now to be described.

Bearing housing 13 supports a base ring 29 adjacent thrust collar 11 utilizing such filler plates 30 as may be required. Base ring 29 is provided with a series of cylindrical openings 31, one such opening for each of the bearing shoes in the Kingsbury type thrust bearing generally indicated at 32. Conventionally, six bearing shoes are provided in a typical Kingsbury type thrust bearing so that there would be six cylindrical openings 31 in base ring 29. An insert 33 is suitably secured in each opening 31 as by bolts 34 and a flexible diaphragm 35 is mounted at the bottom of each opening 31 beneath insert 33 to provide a partition beneath which lubricating oil under pressure collects in pocket 36. Pocket 36 is connected to duct 28 by duct 37 in base ring 29 through flexible coupling 38.

A piston 39 is mounted in insert 31 and is provided with a head 40. A conventional Kingsbury type thrust shoe 41 is mounted for engagement with thrust collar 11 and is provided with an insert 42 having a rounded lower surface 43 for engagement with head 40 allowing shoe 41 to tilt as may be required.

In the embodiment of FIG. 1 when shaft 10 is rotated, thrust is placed upon bearing shoes 15 and lubricating oil under pressure is collected in grooves 22 and transmitted to header 27 and thus through ducts 28 to each of pockets 36. As this pressure increases with increasing thrust on shoes 15, the pressure in pockets 36 increases distorting diaphragm 35 and raising pistons 39 to bring shoes 41 into bearing engagement with collar 11 thus equalizing the thrust load between thrust bearings 14 and 32. Bearing 32 is so adjusted that initially shoes 41 receive no thrust from collar 11 and bearing 32 takes none of the thrust load until shoes 41 have been raised to bring their bearing surfaces into engagement with thrust collar 11.

In the embodiment of FIG. 2, the upper Kingsbury type thrust bearing is the "sender" bearing and the lower Kingsbury type thrust bearing is the "receiver" bearing which receives lubricating oil under pressure from the upper bearing to raise its bearing shoes into thrust receiving engagement with the lower thrust collar. In this embodiment, shaft 44 is provided with spaced thrust collars 45 and 46, all being surrounded by a suitable bearing housing 47. A suitable base ring 48 with filler plates 49, as required, is mounted in housing 47 adjacent collar 45. Conventional load equalizing plates 50 are mounted in ring 48 and plates 50 support conventional Kingsbury type thrust shoes 51 of suitable number. Each shoe 51 is provided with insert 52 having a rounded surface 53 to permit shoe 51 to tilt as may be required. Each shoe 51 is provided with a duct 54 opening through its bearing surface and connecting through flexible coupling 55 with duct 56 in housing 47.

A second base ring 57 is mounted in housing 47 adjacent collar 46 and carries load equalizing plates 58, of conventional construction, which plates 58 support conventional Kingsbury type bearing shoes 59. Each bearing shoe 59 is provided with insert 60 having a rounded surface 61 bearing on equalizing plates 58 so that each bearing shoe 59 may tilt as required. A cylindrical opening 62 is provided in base ring 57 beneath each lower equalizing plate 58 and opening 62 is provided with an insert 63 secured therein by bolts 64. A piston 65 is mounted in insert 63 and has a piston head 66 bearing against filler plate 67. An O-ring 68 may be provided in the outer surface of piston 65 to prevent lubricating oil under pressure from leaking past piston 65.

A duct 69 in housing 47 connects to duct 56 and connects through flexible coupling 70 to chamber 71 formed above piston 65 and the base of cylindrical opening 62. The thickness of filler plate 67 is so chosen that shoe 59 will not engage thrust collar 46 when piston 65 is in the retracted position in insert 63. It should be noted that duct 56 is shown as continuing past duct 69 to indicate that other Kingsbury type thrust bearings of the "receiver" type may be used on shaft 44, as required.

In the embodiment of FIG. 2 when shaft 44 is rotated thrust collar 45 for operating the shoes 51 rapidly builds up the pressure of the lubricating oil on the bearing surface of shoes 51 and this lubricating oil under pressure is taken by duct 54 through duct 56 into chamber 71 where, as the pressure increases a thrust is exerted on piston 65. Since piston 65 is in engagement with filler plate 67 base ring 57 is lifted and bearing shoes 59 are brought into thrust receiving engagement with collar 46 to distribute the thrust load between the thrust bearings.

In the embodiment of FIG. 3 two Kingsbury type thrust bearings are arranged concentrically to receive the thrust from a single thrust collar with the outer bearing being "receiver" bearing is, as before, adjusted so that shoes do not receive thrusts from the thrust collar until moved into engagement therewith by lubricating oil under pressure received from the "sender" bearing. In this figure, shaft 72 is provided with a thrust collar 73 and the assembly is surrounded by a suitable bearing housing 74 provided with a conventional oil retaining sleeve 75. Housing 74 mounts conventional filler plate 77 which in turn supports the base ring 78, ring 78 receiving load equalizing plates 79 of conventional construction. Kingsbury type bearing shoes 80 of suitable number are mounted on load equalizing plates 79 by insert 81 provided with rounded surface 82 so that shoe 80 can tilt as may be required. A retaining ring 83 is mounted around base ring 78 to hold shoes 80 in position. Duct 84 opens through the surface of one or more of shoes 80 to receive lubricating oil under pressure from the bearing surface of the shoes. Duct 84 is connected by flexible coupling 85 to flexible conduit 86.

An outer Kingsbury type thrust bearing arranged concentrically around the above described thrust bearing in housing 74 and is provided with the piston plate 87 which in turn supports base ring 88. Load equalizing plates 89 mounted in base ring 88 to support the conventional Kingsbury type thrust shoes 90 which are mounted for tilting movement thereon by a conventional insert 91 having rounded surface 92 bearing on local equalizing plates 89. Ring 93 is secured to base ring 88 to hold shoes 90 in position. Piston plate 87 is provided with a plurality of cylindrical chambers 94, one for each shoe 90, each cylinder 94 being directly beneath lower equalizing plates between shoes 90. Piston 95 having head 96 dismounted in cylinder 94 with head 96 is in engagement with housing 74. Flexible conduit 86 connects through flexible coupling 97 to duct 98 in ring 87, duct 98 connecting to opening in chamber 99 beneath piston 95. Piston 95 may be provided with O-type ring 100 to prevent loss of oil under pressure around piston 95. The second duct 101 may be provided opening in the chamber 99 and connecting through flexible coupling 102 and conduit 103 with header 104 connecting to the outer of chambers 99 and around the circumference of the thrust bearing.

In the embodiment of FIG. 3 the dimensions of the parts of the outer thrust bearing are so adjusted that bearing shoes 90 do not engage thrust collar 73 until raised by oil under pressure from the "sender" bearing. As shaft 72 rotates thrust is imparted upon shoes 80 and lubricating oil under pressure is taken through duct or ducts 84 and conduits 86 to chambers 99 through the header 104. As the lubricating oil under pressure builds up in chambers 99 piston 95 is prevented from downward movement by housing 74 and the ring 87 is raised. This in turn raises base ring 88 and shoes 90 until shoes 90 come into bearing engagement with collar 73 and take their proportionate share of the thrust load.

In the embodiment of FIG. 4 two Kingsbury type thrust bearings are arranged concentrically to receive the thrust from a single thrust collar, the inner thrust bearing being the "sender" and the outer thrust bearing being the "receiver." In this embodiment the header for distributing the lubricating oil under pressure to the several bearing shoes of the "receiver" bearing is disposed between the thrust bearing. In FIG. 4, shaft 105 is provided with thrust collar 106 surrounded by housing 107 with a conventional oil retaining cylinder 108. The "sender" thrust bearing is provided with suitable filler plate 110 supporting base ring 111 which in turn carries load equalizing plates 112 of conventional design. Bearing shoe 113 is supported by insert 114 having rounded surfaces 115 engaging the equalizing plates 112 so that shoes 113 may tilt as required. Spacing ring 116 keeps shoes 113 in position and in turn is held in place by outer rings 117. Duct 118 opens through the bearing surface of shoe 113 and connects through flexible coupling 119 and conduit 120 with header 121. Outer thrust bearing is mounted on filler plates 122 and 123 which are supported by housing 107 and the base ring 124 is secured to plate 123 by bolts 125. Load equalizing plates 126, of conventional type, are mounted within ring 124. Any appropriate number of bearing shoes 127 of conventional design are carried on top of ring 124 and are held in place by outer ring 128. A cylindrical opening 129 is let into base ring 124 beneath each shoe 127 to receive shoe support 130. A cylindrically apertured insert 131 is mounted in shoe support 130 and receives piston 132 therein. Piston 132 has head 133 engaging equalizing plates 126. Fluid under pressure is taken from conduit 120 to duct 134 in base ring 124 and through flexible coupling 135 to chamber 136 behind piston 132. The outer bearing construction is so disposed that shoes 127 do not engage collar 106 until raised in position by oil supplied under pressure behind piston 132.

In the embodiment of FIG. 4 when shaft 105 is rotated lubricating oil under pressure is collected by duct 118 and is taken through conduit 120 and duct 134 to chamber 136 behind piston 132. As pressure builds up in chamber 136 piston 132 cannot move downwardly and shoe support 130 is therefore raised upwardly raising shoe 127 into thrust receiving engagement with collar 106. All of the shoes 127 are similarly raised by reason of the lubricating oil under pressure conducted thereto through duct 121. When the shaft 105 is rotating the entire thrust load will therefore be equally divided between the two thrust bearings.

It should now be apparent that this invention in every way satisfies the several objectives described above.

Changes in or modifications to the above described illustrative embodiments of this invention may now be suggested to those skilled in the art without departing from the present inventive concept. Reference should therefore be had to the appended claims to determine the scope of this invention.

What is claimed is:

1. In apparatus for equalizing thrust load between thrust bearings of the Kingsbury type, a shaft, spaced thrust collars on said shaft, a Kingsbury type thrust bearing disposed about said shaft for each of said collars, a plurality of thrust bearing shoes for each of said thrust bearings, the shoes of the first of said thrust bearings engaging their respective thrust collar at all times, the shoes of the others of said thrust bearings being out of engagement with their respective thrust collar when said shaft is at rest, the bearing surfaces of said shoes and of said thrust collars being submerged in lubricating oil, means for collecting lubricating oil under pressure from the bearing surface of at least one of said shoes of said first thrust bearing when said shaft is rotated, expansible means beneath each of said shoes of said other thrust bearings, and means for conducting the lubricating oil under pressure from said first thrust bearing to said expansible means whereby said bearing shoes of said other thrust bearings are moved into thrust receiving engagement with their respective thrust collar.

2. Apparatus as described in claim 1, said collecting means consisting of an opening through the bearing surface of each of the bearing shoes collecting lubricating oil under pressure, and said conducting means comprising a conduit connected to said opening and to said expansible means.

3. Apparatus as described in claim 1, said thrust bearings each including a base ring, said expansible means including a piston for and supporting each bearing shoe of said other thrust bearings mounted for movement in the adjacent base ring, the lubricating oil under pressure being admitted to said piston in the adjacent base ring.

4. Apparatus as described in claim 1, said thrust bearings each including a base ring and filler plates beneath each base ring, said expansible means including a piston for each bearing shoe of said other thrust bearings mounted in the adjacent base ring and bearing against the adjacent filler plate, the lubricating oil under pressure being admitted to said piston in the adjacent base ring.

5. Apparatus as described in claim 1, said collecting means consisting of an opening through the bearing surface of each of the bearing shoes collecting lubricating oil under pressure, and said conducting means comprising a conduit connected to said opening and to said expansible means, said thrust bearings each including a base ring, said expansible means including a piston for and supporting each bearing shoe of said other thrust bearings mounted for movement in the adjacent base ring, the lubricating oil under pressure being admitted to said piston in the adjacent base ring.

6. Apparatus as described in claim 1, said collecting means consisting of an opening through the bearing surface of each of the bearing shoes collecting lubricating oil under pressure, and said conducting means comprising a conduit connected to said opening and to said expansible means, said thrust bearings each including a base ring and filler plates beneath each base ring, said expansible means including a piston for each bearing shoe of said other thrust bearings mounted in the adjacent base ring and bearing against the adjacent filler plate, the lubricating oil under pressure being admitted to said piston in the adjacent base ring.

7. In apparatus for equalizing thrust load between thrust bearings of the Kingsbury type, a shaft, at least one thrust collar on said shaft, at least two Kingsbury type thrust bearings disposed about said shaft to receive thrust from said collar, a plurality of thrust bearing shoes for each of said thrust bearings, the shoes of a first one of said thrust bearings engaging their thrust collar at all times, the shoes of the others of said thrust bearings being out of engagement with their thrust collar when said shaft is at rest, the bearing surfaces of said shoes and of said thrust collar being submerged in lubricating oil, means for collecting lubricating oil under pressure from the bearing surface of at least one of said shoes of said first thrust bearing when said shaft is rotated, expansible means beneath each of said shoes of said other thrust bearings and means for conducting lubricating oil under pressure from said first thrust bearing to said expansible means whereby said bearing shoes of said other thrust bearing are moved into thrust receiving engagement with their thrust collar.

8. Apparatus as described in claim 7, said collecting means consisting of an opening through the bearing surface of each of the bearing shoes collecting lubricating oil under pressure, and said conducting means comprising a conduit connected to said opening and to said expansible means.

9. Apparatus as described in claim 7, said thrust bearings each including a base ring, said expansible means including a piston for and supporting each bearing shoe of said other thrust bearings mounted for movement in the adjacent base ring, the lubricating oil under pressure being admitted to said piston in the adjacent base ring.

10. Apparatus as described in claim 7, said thrust bearings each including a base ring and filler plates beneath each base ring, said expansible means including a piston for each bearing shoe of said other thrust bearings mounted in the adjacent base ring and bearing against the adjacent filler plate, the lubricating oil under pressure being admitted to said piston in the adjacent base ring.

11. Apparatus as described in claim 7, said collecting means consisting of an opening through the bearing surface of each of the bearing shoes collecting lubricating oil under pressure, and said conducting means comprising a conduit connected to said opening and to said expansible means, said thrust bearings each including a base ring, said expansible means including a piston for and supporting each bearing shoe of said other thrust bearings mounted for movement in the adjacent base ring, the lubricating oil under pressure being admitted to said piston in the adjacent base ring.

12. Apparatus as described in claim 7, said collecting means consisting of an opening through the bearing surface of each of the bearing shoes collecting lubricating oil under pressure, and said conducting means comprising a conduit connected to said opening and to said expansible means, said thrust bearings each including a base ring and filler plates beneath each base ring, said expansible means including a piston for each bearing shoe of said other thrust bearings mounted in the adjacent base ring and bearing against the adjacent filler plate, the lubricating oil under pressure being admitted to said piston in the adjacent base ring.

13. Apparatus as described in claim 7, said thrust bearing being disposed concentrically about said shaft receiving thrust from a single thrust collar.

14. Apparatus as described in claim 13, including a header between said thrust bearing receiving lubricating oil under pressure from the bearing shoes collecting oil under pressure and conduits from said header to said expansible means.

15. Apparatus as described in claim 13 including a header outside of the outer of said thrust bearings receiving lubricating oil under pressure from the bearing shoes collecting oil under pressure and conduits from said header to said expansible means.

References Cited in the file of this patent
UNITED STATES PATENTS
1,169,206    Sydney _____ Jan. 25, 1916